United States Patent [19]

Bissinger

[11] Patent Number: 5,149,348
[45] Date of Patent: Sep. 22, 1992

[54] FILTER SYSTEM FOR LARGE CONTAINERS
[75] Inventor: Heinz Bissinger, Zaberfeld, Fed. Rep. of Germany
[73] Assignee: Bissinger GmbH, Fed. Rep. of Germany
[21] Appl. No.: 720,427
[22] PCT Filed: Mar. 7, 1990
[86] PCT No.: PCT/DE90/00162
§ 371 Date: Jun. 28, 1991
§ 102(e) Date: Jun. 28, 1991
[87] PCT Pub. No.: WO90/11816
PCT Pub. Date: Oct. 18, 1990

[30] Foreign Application Priority Data
Mar. 30, 1989 [DE] Fed. Rep. of Germany ....... 3910203
Sep. 16, 1989 [DE] Fed. Rep. of Germany ....... 3931033
[51] Int. Cl.[5] ............................................. B01D 46/00
[52] U.S. Cl. ........................................ 55/478; 55/502; 55/341.1; 220/344
[58] Field of Search ..................... 55/478–481, 55/341.1–341.7, 502; 220/344

[56] References Cited
U.S. PATENT DOCUMENTS
2,335,963 12/1943 Ponselle .............................. 55/373
3,362,138 1/1968 Acker ................................. 55/481
3,486,310 12/1969 Nilsson .............................. 55/502
4,909,814 3/1990 Sisk et al. ......................... 55/341.1

FOREIGN PATENT DOCUMENTS
3425215 1/1985 Fed. Rep. of Germany .

Primary Examiner—Bernard Nozick
Attorney, Agent, or Firm—Speckman & Pauley

[57] ABSTRACT

A filter system for large containers, in particular, silos, with a hollow section containing at least one filter and having an air inlet opening connectable with the large container and an air outlet opening in communication with the filter is disclosed. The filter is insertable into the air outlet opening and is supported by a filter flange on the edge of the air outlet opening. The end of the hollow section having the air outlet opening is covered by a dome connected to the hollow section such that it is movable between an open and closed position.

36 Claims, 5 Drawing Sheets

FILTER SYSTEM FOR LARGE CONTAINERS

BACKGROUND OF THE INVENTION

1. Field of the Invention

This invention relates to a filter system for large containers, in particular silos, comprising a hollow section containing at least one filter, one end of which is connectable to the large container and has an air inlet opening, while the other end has an air outlet opening in communication with the filter.

2. Description of the Prior Art

Conventional filter systems for large containers, in particular silos, are, as a rule, disposed on the top of the large container to trap dust particles generated and exhausted from the container during the course of filling the large container. A plurality of filter systems is secured to the roof of the large container, on which systems maintenance is performed at regular intervals. If the filter elements of the filter system become inoperative, they must be replace within a very short period of time. This is true, particularly, if they become inoperative during the filling of the large container.

Based on the above state of the art, it is the object of this invention to improve the filter system of the species without undue structural modifications such that replacement of the filter element(s) can be accomplished within a very short time.

This object is attained in accordance with this invention where the filter is inserted into the air outlet opening from the outside and is supported by a sealing flange on the edge of the exterior of the air outlet opening. The end of the hollow section having the air outlet opening can be covered with a dome. The dome is operationally connected to the hollow section and in communication with the air outlet opening. The dome is secured under pressure to the flange while in the operative position and, while in the inoperative position, leaves open the end.

In accordance with one embodiment of this invention, the hollow section, which is secured to the large container in an airtight manner, is equipped with at least one filter element which, on the one hand, is connected to the top side of the hollow section in an airtight manner and, on the other hand, is exchanged quickly and without problems. Preferably, the filter elements are cylinder-shaped bodies through which the contaminated and dust particle-containing air radially flows into the interior of the hollow section. The interior of the hollow section in turn, is in communication with the air outlet opening of the hollow section through which the air is exhausted. The filter elements may have a diameter up to 80 cm and a length of more than 100 cm. The dome, which as a rule has considerable weight, absorbs the pressure acting on the filter elements. A pressure wave is created when the large containers are filled, which has the potential of displacing the filter elements axially upward. Such movement of the filter elements is prevented by the dome.

In accordance with a preferred embodiment of this invention, the air outlet opening has a flange disposed in the interior of the hollow section, which radially surrounds the filter flange. The filter flange has a truncated cone-shaped section and an annular section. The annular section encloses the base of the truncated cone-shaped section and is designed to support the filter. To improve the connection between the flange of the air outlet opening and the filter flange, in accordance with another embodiment of this invention, the air outlet opening flange is interlocked with the truncated cone-shaped section of the filter flange.

To increase the pressure acting on the filter flange from the direction of the dome, in accordance with another embodiment of this invention, in the operational position of the dome, the distance of the dome from the air outlet opening side of the hollow section is less than the thickness of the filter flange. The filter flange is made preferably of plastic or rubber, while the hollow section and the dome are made preferably of metal.

In accordance with another embodiment of this invention, the opening of the dome is enclosed by a flange, protruding in the direction of the hollow section and in contact under pressure with the filter flange. As a result, the filter flange is clamped not only between the dome and the top side of the hollow section, but also between the flanges of the hollow section and the dome, providing an interlocking and frictional connection between these parts.

In accordance with still another embodiment of this invention, the dome is releasably connected to the hollow section by a hinge and a clamping device. In this connection these measures can also be taken by the dome being swivelable in a horizontal and/or a vertical plane by at least 90°. Thus, the dome can be swivelled around a horizontal as well as a vertical axis.

In accordance with embodiments of this invention in which the filter system has a cylindrical or cuboid hollow section and a plurality of filter elements, a sealing ring, which surrounds the filter elements, is preferably clamped between the dome and the hollow section.

To prevent dirt from entering the outlet side of the filter elements, in accordance with another embodiment of this invention, the side of the dome facing the hollow section has a pressure plate with openings, the form of which approximately corresponds to the top side of the hollow section. Preferably, the pressure plate is connected to the dome by struts, between which the filtered air flowing out of the large container can reach the outside. The top side of the hollow section is thus surrounded on all sides, so that the air flowing vertically upwards through the filter elements is deflected on the inside of the concave dome and flows to the outside along the radial exterior of the hollow section.

To remove the dirt particles deposited on the radial exterior of the filter elements more easily, in accordance with another embodiment of this invention, nozzles, which are directed into the openings and are connected to a compressed air line, are provided between the dome and the pressure plate. If the radial inside of the hollow-cylindrical filter elements is charged with (clean) compressed air in a pulsed manner, the dust particles are loosened from the radial exterior of the filter elements and flow to the interior of the large container.

BRIEF DESCRIPTION OF THE DRAWINGS

An exemplary embodiment of the invention is schematically illustrated in the drawings and will be described in more detail below. Shown are in.

Figure 1:
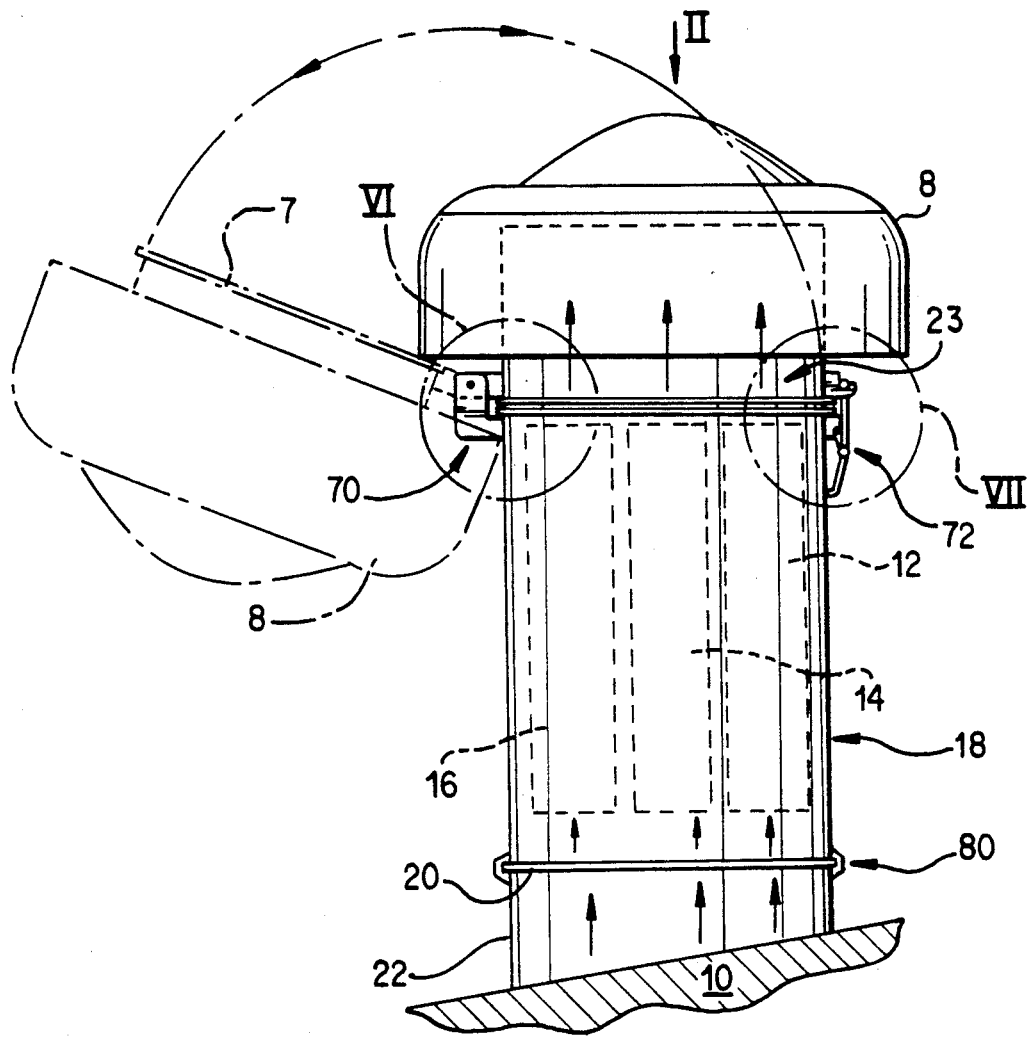
FIG. 1 a lateral view of a filter system in accordance with one embodiment of this invention, FIG. 2 a vertical top view of the hollow section without the dome and without filter elements in the direction of the arrow II of FIG. 1, FIG. 3 a partial vertical section of a flange of the filter element, FIG. 4 a partial vertical section of a flange of a further filter element, FIG. 5 a partial vertical section of a flange of another filter element, FIG. 6 the part of FIG. 1 indicated by VI, shown enlarged, FIG. 7 the part of FIG. 1 indicated by VII, shown enlarged, FIG. 8 a partial vertical section of a flange of a filter element where the pressure plate is in the form of a grid, FIG. 9 a filter system in which the dome can be operated by means of a control element, and FIG. 10 a top view in the direction of the arrow X of FIG. 9, but without the dome.
Figure 2:
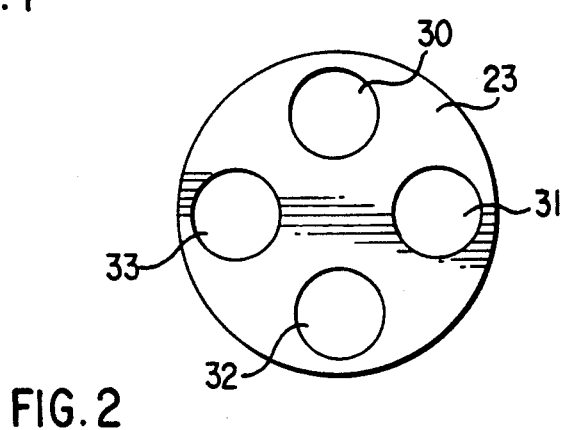

A filter system for a large container 10 comprising a hollow section 18 containing a plurality of filters 12, 14, 16 is shown in FIG. 1. Air inlet side 20, which is connectable to the large container 10, is an air inlet opening, while the air outlet side 23 has air outlet openings 30, 31, 32, 33, in communication with the filters 12, 14, 16. The filters 12, 14, 16 can be inserted from the outside into the air outlet openings 30, 31, 32, 33 and are supported on the outside of the air outlet openings 30, 31, 32, 33 by flanges 40, 41 and 42. Air outlet side 23 of the hollow section 18 having the air outlet openings 30, 31, 32, 33 is covered by a dome 8 hinged on the hollow section 18. The dome 8 has openings 50, 51 and 52 in communication with the air outlet openings 30, 31, 32, 33 and, when closed, is connected under pressure to the flanges 40, 41 and 42.

Figure 3:
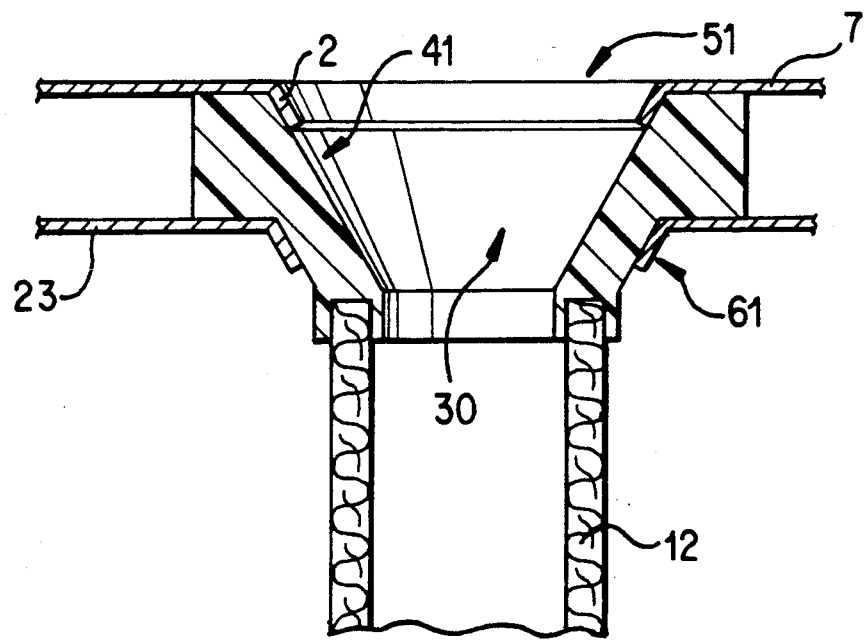
Figure 4:
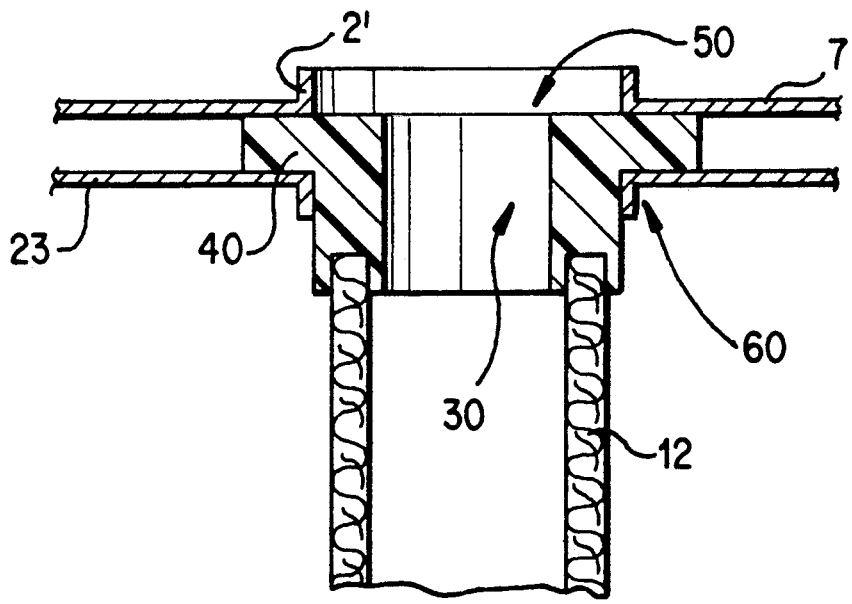
Figure 5:
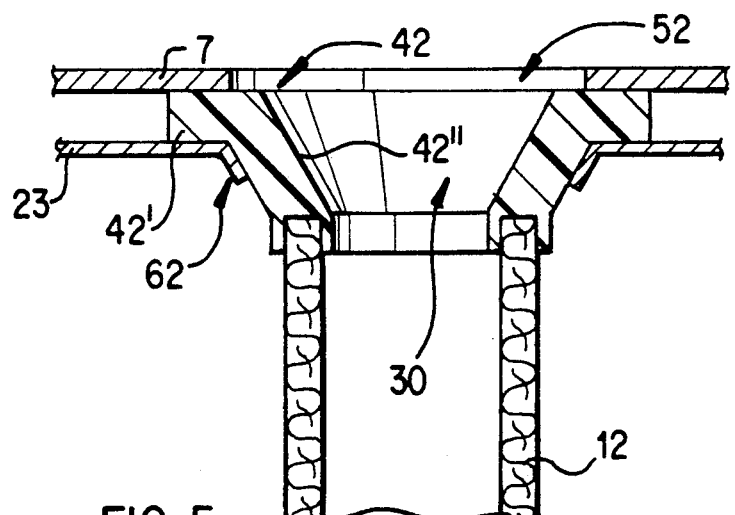

Air outlet opening 30 has a flange 60, 61, 62 projecting into the interior of the hollow section 18, which radially surrounds the filter flange 40, 41 and 42. The filter flange 42 has a truncated cone-shaped section 42" and an annular section 42', the annular section 41' surrounding the base of the truncated cone-shaped section 42, 42" and supporting filter element 12. The air outlet opening flanges 61 and 62 can be interlockingly connected with the filter flanges 41 and 42. The side of the dome 8 facing the hollow section has a pressure plate 7 with openings 50, 51, 52, and approximately corresponds with the top side of the hollow body 18. When dome 8 is closed, the distance of the pressure plate 7 from the air outlet side 23 of the hollow section 18 is less than the thickness of the filter flanges 40, 41 and 42. In the exemplary embodiments in accordance with FIGS. 3 and 4, the openings formed in the pressure plate 7 have been provided with flanges 2 and 2', the flange 2 (FIG. 3) being downward bent and connected under pressure with the filter flange 41, while the flange 2' faces away from the filter flange 40.

Figure 6:
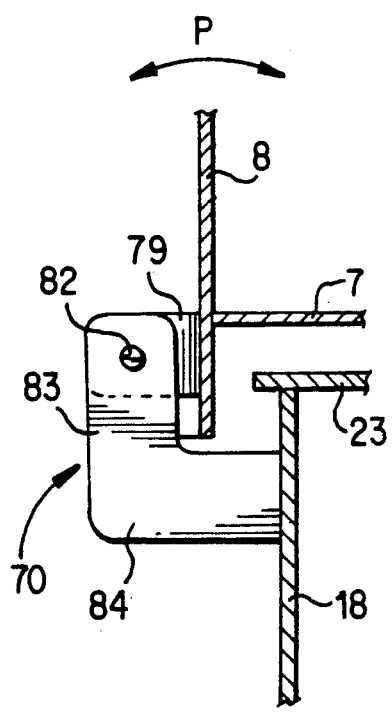

FIG. 6 shows one embodiment of this invention in which the dome 8 is connected with the hollow section 18 by a hinge element 70. The hinge element 70, essentially L-shaped, has a leg 84 welded to the hollow section 18 and vertically oriented leg 83. The dome 8 has a leg 79, which is hinged to the leg 83 in the area 82. In accordance with this embodiment of this invention, dome 8 is pivoted in the direction of the double arrow P. However, the hinge element could also be designed such that the dome 8 is pivoted in a horizontal plane.

Figure 7:
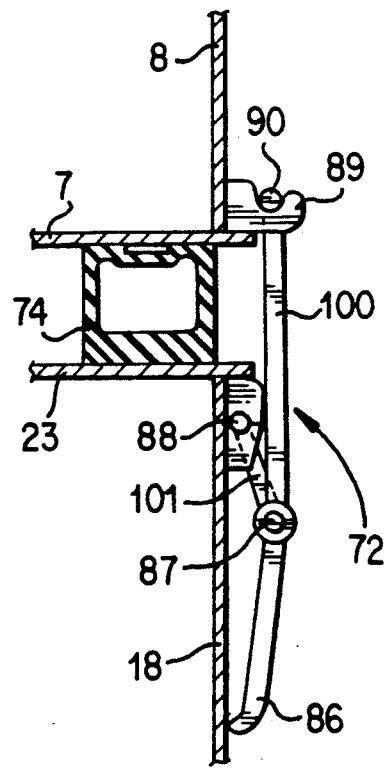

FIG. 7 shows another embodiment of this invention in which sealing device 74 is clamped between the air outlet side 23 and the pressure plate 7. A firm connection between the dome 8 and the hollow section 18 is provided by a clamping element 72. The clamping element 72 consists of a clamp clip 100, which is pivotable by protrusion 89 in the area 90, welded to the dome 8. The clamp clip 100 has an actuating area 86, which is hinged through leg 101 to the container 18 in the area 88.

FIG. 1 further shows fixed stud 22 disposed on the top side of the large container 10, which can be releasably connected with the hollow section 18 by clamping device 80.

Figure 8:
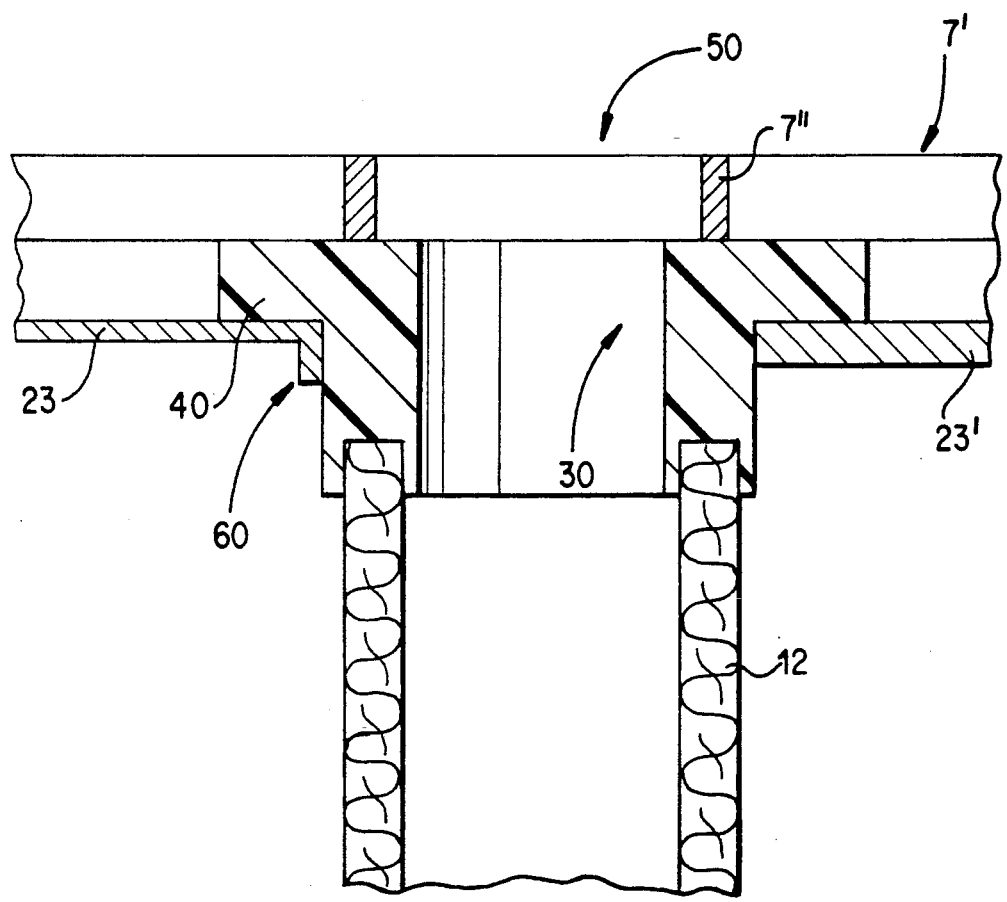

In accordance with the embodiment of this invention shown in FIG. 8, pressure plate 7' comprises a grid with holes 7" which are of such dimensions that each hole is connected under pressure with each flange 40. The grid 7' may be made of wire or a piece of sheet metal with stamped-out holes. If its thickness is sufficient, the cover forming the air outlet side 23 can be made without a border (right side of FIG. 8), otherwise with a border 60 (left side of FIG. 8).

Figure 9:
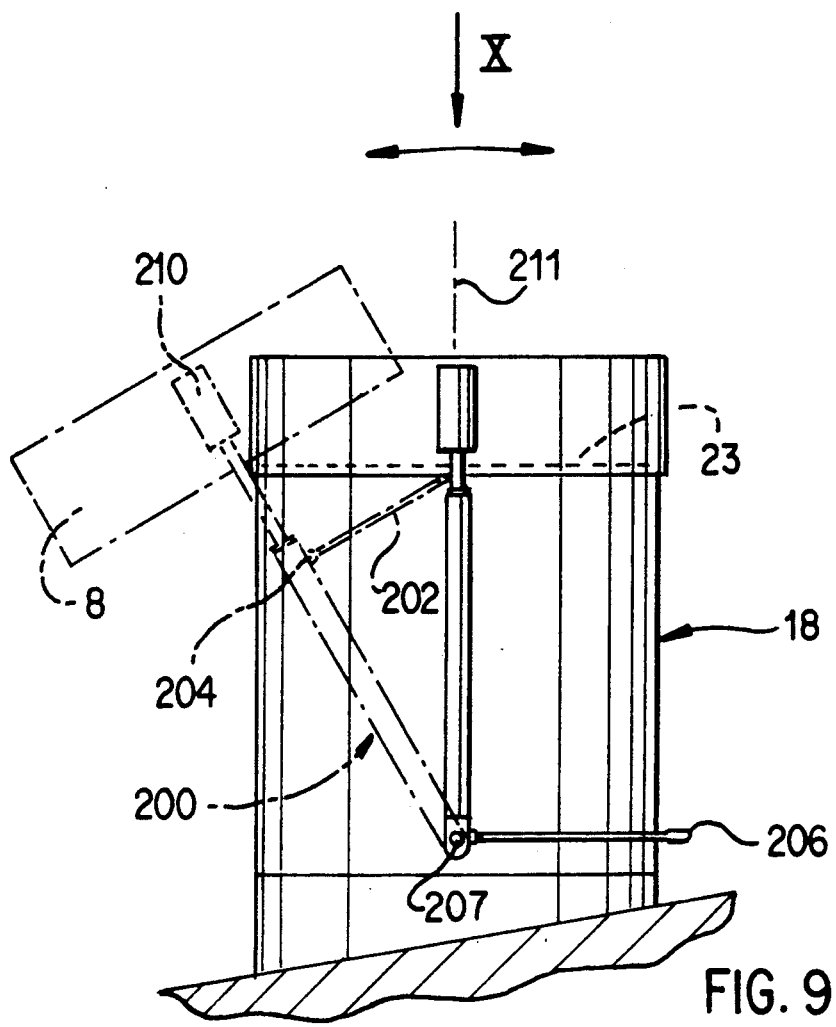
Figure 10:
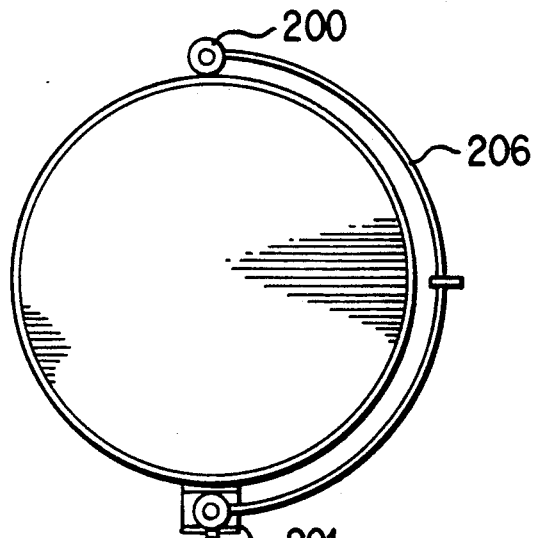

A lifting and pivoting device in accordance with one embodiment of this invention comprising two work cylinders 200, 201, is shown in FIGS. 9 and 10, which lifting and pivoting device is hinged at the hinge point 207 on the hollow section 18 and is pivotable in the direction of the double arrow. The work cylinders 200, 201 are connected to a compressed air line 206 and can be displaced back and forth in the direction of the piston rods. The compressed air line is also connected to a nozzle. To control the compressed air, at least one valve, not shown, is provided by which compressed air is routed either to the nozzle or to the work cylinders. In their effective operational positions, the compressed air cylinders push the dome 8 against the hollow section 18, so that an airtight seal between the dome 8 and the hollow section 18 is assured. If the filter elements are to be cleaned or replaced, the piston rods of the work cylinders are extended, the dome 8 is lifted and the work cylinders 200, 201 are pivoted.

Disposition of the dome 8 outside of the air outlet side 23 is not required. It is sufficient if it is located laterally of the center axis 211. After the filter elements disposed to the right of the center axis 211 have been replaced, the dome 8 can be pivoted towards the right so that the left side of the hollow section 18 is exposed. The pivot movements of the work cylinders 200, 201 are defined by a limiting member 202. This can be a rope, a chain or the like. The advantage of this embodiment lies in that large and heavy domes 8 can be operated simply and quickly.

I claim:

1. In a filter apparatus for a large container with a hollow housing containing at least one filter, having an air inlet opening connectable with the large container and an air outlet opening in communication with the filter, the improvement comprising:

the filter (12, 14, 16) insertable into the air outlet opening (30 to 33) and supported by a filter flange (40, 41, 42) on an edge of the air outlet opening (30 to 33), and an air outlet side (23) of the hollow housing (18) having the air outlet opening (30 to 33) coverable with a dome (8), said dome (8) operationally connected to the hollow housing (18) and in communication with the air outlet opening (30 to 33), connected under pressure with a filter flange (40, 41, 42) in a closed position and, in an open position, uncovers the air outlet side (23).

2. In a filter apparatus in accordance with claim 1, wherein
the filter flange (42) has a truncated cone-shaped section (42″) and an annular section (42′), the annular section (42′) enclosing a base of the truncated cone-shaped section (42″) and supporting the filter (12).

3. In a filter apparatus in accordance with claim 1, wherein
an air outlet opening flange (62) is interlocked with a truncated cone-shaped section (42″) of the filter flange (42).

4. In a filter apparatus in accordance with claim 1, wherein
in the closed position of the dome (8), a distance of the dome (8) from the air outlet opening side (23) of the hollow housing (18) is less than a thickness of the filter flange (40, 41, 42) when not under a load.

5. In a filter apparatus in accordance with claim 1, wherein
a pressure plate opening (51) of the dome (8) is enclosed by a pressure plate flange (2), protruding in a direction of the hollow housing (18) and in contact under pressure with the filter flange (41).

6. In a filter apparatus in accordance with claim 1, wherein
the dome (8) couples with the hollow housing (18) by one of a hinge (70) and a clamping device (72) and a lifting and pivoting device.

7. In a filter apparatus in accordance with claim 1, wherein
the dome (8) is swivelable in at least one of a horizontal and a vertical plane by at least 90°.

8. In a filter apparatus in accordance with claim 1, wherein
a sealing ring (74) surrounds the filter elements (12, 14, 16) and is clamped between the dome (8) and the hollow housing (18).

9. In a filter apparatus in accordance with claim 1, wherein
a lifting and pivoting device comprises at least one control element (200, 201) connected to the dome (8), which, in a closed position of the dome (8) presses it axially and maintains it against the hollow housing (18), while in an open position of the dome (8) maintains the dome (8) to a side of a center axis (211) of the hollow housing.

10. In a filter apparatus in accordance with claim 1, wherein
at least two control elements (200, 201) in the form of work cylinders are connected to the hollow housing (18) and are laterally pivotable in relation to a center axis (211) of the hollow housing.

11. In a filter apparatus in accordance with claim 1, wherein
at least two control elements (200, 201) are disposed outside of the hollow housing (18) and are hinged on said hollow housing (18).

12. In a filter apparatus in accordance with claim 1, wherein
a pivot limit member (202) cooperates with at least two control elements (200, 201) and assures that the dome (8) attains a defined position in an open position.

13. In a filter apparatus in accordance with claim 1, wherein
at least two control elements (200, 201) are connected to compressed air line.

14. In a filter apparatus in accordance with claim 1, wherein
the dome (8) is coordinated with the hollow housing (18) by a lifting and pivoting device.

15. In a filter apparatus in accordance with claim 14, wherein
the dome (8) is pivoted by at least 90° in at least one of a horizontal and a vertical plane.

16. In a filter apparatus in accordance with claim 14, wherein
the lifting and pivoting device comprises at least one control element (200, 201) connected to the dome (8), which, in a closed position of the dome (8) presses it axially and maintains it against the hollow housing (18), while in an open position of the dome (8) maintains the dome (8) to a side of a center axis (211) of the hollow housing.

17. In a filter apparatus in accordance with claim 1, wherein
a pressure plate side of the dome (8) facing the hollow housing (18) has a pressure plate (7) with said air outlet openings (30, 31, 32, 33) which corresponds to the air outlet side of the hollow housing (18).

18. In a filter apparatus in accordance with claim 17, wherein
the pressure plate (7) is connected to the dome (8) by struts, between which filtered air flowing out of the large container can reach the outside.

19. In a filter apparatus in accordance with claim 1, wherein
the air outlet opening (30) has an air outlet opening flange (60, 61, 62) disposed in an interior of the hollow housing (18), which radially surrounds the filter flange (40, 41, 42).

20. In a filter apparatus in accordance with claim 19, wherein
the filter flange (42) has a truncated cone-shaped section (42″) and an annular section (42′), the annular section (42′) enclosing a base of the truncated cone-shaped section (42″) and supporting the filter (12).

21. In a filter apparatus in accordance with claim 20, wherein
an air outlet opening flange (62) is interlocked with a truncated cone-shaped section (42″) of the filter flange (42).

22. In a filter apparatus in accordance with claim 21, wherein
in the closed position of the dome (8), a distance of the dome (8) from the air outlet opening side (23) of the hollow housing (18) is less than a thickness of the filter flange (40, 41, 42) when not under a load.

23. In a filter apparatus in accordance with claim 22, wherein
a pressure plate opening (51) of the dome (8) is enclosed by a pressure plate flange (2), protruding in a direction of the hollow housing (18) and in contact under pressure with the filter flange (41).

24. In a filter apparatus in accordance with claim 23, wherein
the dome (8) couples with the hollow housing (18) by one of a hinge (70) and a clamping device (72) and a lifting and pivoting device.

25. In a filter apparatus in accordance with claim 24, wherein
the dome (8) is swivelable in at least one of a horizontal and a vertical plane by at least 90°.

26. In a filter apparatus in accordance with claim 25, wherein a sealing ring (74) surrounds the filter elements (12, 14, 16) and is clamped between the dome (8) and the hollow housing (18).

27. In a filter apparatus in accordance with claim 26, wherein
a pressure plate side of the dome (8) facing the hollow housing (18) has a pressure plate (7) with said air outlet openings (30, 31, 32, 33) which corresponds to the air outlet side of the hollow housing (18).

28. In a filter apparatus in accordance with claim 27, wherein
the pressure plate (7) is connected to the dome (8) by struts, between which filtered air flowing out of the large container can reach the outside.

29. In a filter apparatus in accordance with claim 28, wherein
a lifting and pivoting device comprises at least one control element (200, 201) connected to the dome (8), which, in a closed position of the dome (8) presses it axially and maintains it against the hollow housing (18), while in an open position of the dome (8) maintains the dome (8) to a side of a center axis (211) of the hollow housing.

30. In a filter apparatus in accordance with claim 29, wherein
at least two control elements (200, 201) in the form of work cylinders are connected to the hollow housing (18) and are laterally pivotable in relation to a center axis (211) of the hollow housing.

31. In a filter apparatus in accordance with claim 30, wherein
at least two control elements (200, 201) are disposed outside of the hollow housing (18) and are hinged on said hollow housing (18).

32. In a filter apparatus in accordance with claim 31, wherein
a pivot limit member (202) cooperates with at least two control elements (200, 201) and assures that the dome (8) attains a defined position in an open position.

33. In a filter apparatus in accordance with claim 32, wherein
at least two control elements (200, 201) are connected to compressed air line.

34. In a filter apparatus in accordance with claim 33, wherein
the dome (8) is coordinated with the hollow housing (18) by a lifting and pivoting device.

35. In a filter apparatus in accordance with claim 34, wherein
the dome (8) is pivoted by at least 90° in at least one of a horizontal and a vertical plane.

36. In a filter apparatus in accordance with claim 35, wherein
the lifting and pivoting device comprises at least one control element (200, 201) connected to the dome (8), which, in a closed position of the dome (8) presses it axially and maintains it against the hollow housing (18), which in an open position of the dome (8) maintains the dome (8) to a side of a center axis (211) of the hollow housing.

* * * * *